United States Patent [19]

Davis

[11] Patent Number: 4,514,016
[45] Date of Patent: Apr. 30, 1985

[54] LOW FRICTION PIVOT

[75] Inventor: Roland O. Davis, Santa Ynez, Calif.

[73] Assignee: Santa Barbara Research Center, Goleta, Calif.

[21] Appl. No.: 541,941

[22] Filed: Oct. 14, 1983

Related U.S. Application Data

[62] Division of Ser. No. 295,053, Aug. 21, 1981, Pat. No. 4,438,983.

[51] Int. Cl.³ ............................................. F16C 32/00
[52] U.S. Cl. ..................................... 308/2 A; 403/291
[58] Field of Search ....................... 308/2 A, 2 R, 6 R; 403/291

[56] References Cited

U.S. PATENT DOCUMENTS

| 2,674,502 | 6/1954 | Faxen | 308/2 |
| 3,471,668 | 10/1969 | Wilkes | 200/153 |
| 4,000,659 | 1/1977 | Li | 308/2 |

Primary Examiner—Lenard A. Footland
Attorney, Agent, or Firm—Mark J. Meltzer; A. W. Karambelas

[57] ABSTRACT

Low friction pivot 10 has base 12 and pivot pin 16. Bands 22, 24, and 26 are secured to the base 12 on one end and half-wrapped around the cylindrical pivot pin 16 on the other end. The slot 18 in pin 16 is for receiving and clamping that end of the bands. The torque caused by the bent bands is equal so that in any rotative position there is no net torque applied to pin 16.

3 Claims, 3 Drawing Figures

LOW FRICTION PIVOT

This is a division of application Ser. No. 295,053, filed Aug. 21, 1981, now U.S. Pat. No. 4,438,983.

BACKGROUND OF THE INVENTION

This invention is directed to a low friction pivot, particularly a pivot which has no sliding motion and thus does not require lubrication.

Pivot structures are well known, and most machinery requires the rotation of one member with respect to another. Bearings are highly developed in the art, and the most common bearing structure is where a cylindrical pin rotates within a corresponding bearing surface. Lubrication is required in the ordinary installation, and where high rotative speeds are achieved there is no metal to metal contact because of the hydrodynamic forces which separate the relatively moving parts. In order to overcome the relative sliding motion, antifriction bearings have been developed. These antifriction bearings have balls therein running in races, or have cylindrical or conical rollers therein operating between races. Since there is a small amount of rubbing in such bearings, due to deflections under load, lubrication is required to obtain a reasonable life. Lubrication produces problems, particularly in installations which are intended to operate at temperature extremes. At very low temperatures, the hydrocarbon type of oil and grease becomes hard. At very high temperatures, such lubricants vaporize. Specialized lubricants have been developed to extend the temperature operating range of such bearings, but such do not satisfy all the requirements. Some installations operate in vacuum, and such absence of atmospheric pressure gives further rise to lubrication difficulties. However, where continuous rotation is required, the installation must be designed so that those problems are not overwhelming. Such rotating shaft structures also have the problem of rotating friction. At high speeds, hydrodynamic lubrication eliminates metal to metal rubbing contact and thus the drag problems and mostly related to the shear in the lubricant. However, in slowly rotating pivots the starting drag can seriously hinder linearity of motion.

In rotating structures where very limited rotation is required, the bending of a structure can be employed to permit the rotation. Examples of such a structure are found in the following U.S. Pat. Nos. Re 30,290; ;3,288,541; 3,384,424; 3,575,475; 3,597,938; 4,700,289 and 3,811,172. These patents are rather accumulative in their teaching and teach that very limited rotational motion of one member with respect to another may be accomplished by the bending of metal. One particular teaching of each of these patents is that the webs in bending all operate in the same rotary direction and apply a resilient restoring force toward the zero, non-flexure postion. Thus, the employment of such structures is limited to uses wherein the angular rotation is very small and wherein a large restoring force can be tolerated.

SUMMARY OF THE INVENTION

In order to aid in the understanding of this invention it can be stated in essentially summary form that it is directed to a low friction pivot wherein the pivot pin has a circular section around the pivot axis. A plurality of bands is provided, with one end of each clamped onto the pivot pin and the other clamped to the base. The bands are resilient and rotation of the pivot pin with respect to the base, causes winding of at least one band and unwinding of at least one other band to permit balancing of the band winding forces.

It is thus a purpose and advantage of this invention to provide a low friction pivot structure wherein flexure bands wind and unwind from a pivot pin during its rotation to permit balancing of band bending forces. It is a further purpose to provide a low friction pivot which has a plurality of bands attaching the pivot pin to a base, with the bands winding and unwinding from the pivot pin and with a sufficient length of band to provide a substantial rotation of the pivot pin. It is another purpose to provide a low friction pivot which has flexure bands therein which are equally stressed in opposite directions and which are stressed to a maximum limit as a function of the pivot pin diameter so that further rotation of the pivot structure does not cause further band stress.

Other purposes and advantages of this invention will become apparent from a study of the following portion of this specification, the claims and the attached drawings.

DESCRIPTION OF THE PREFERRED EMBODIMENTS

Figure 1:
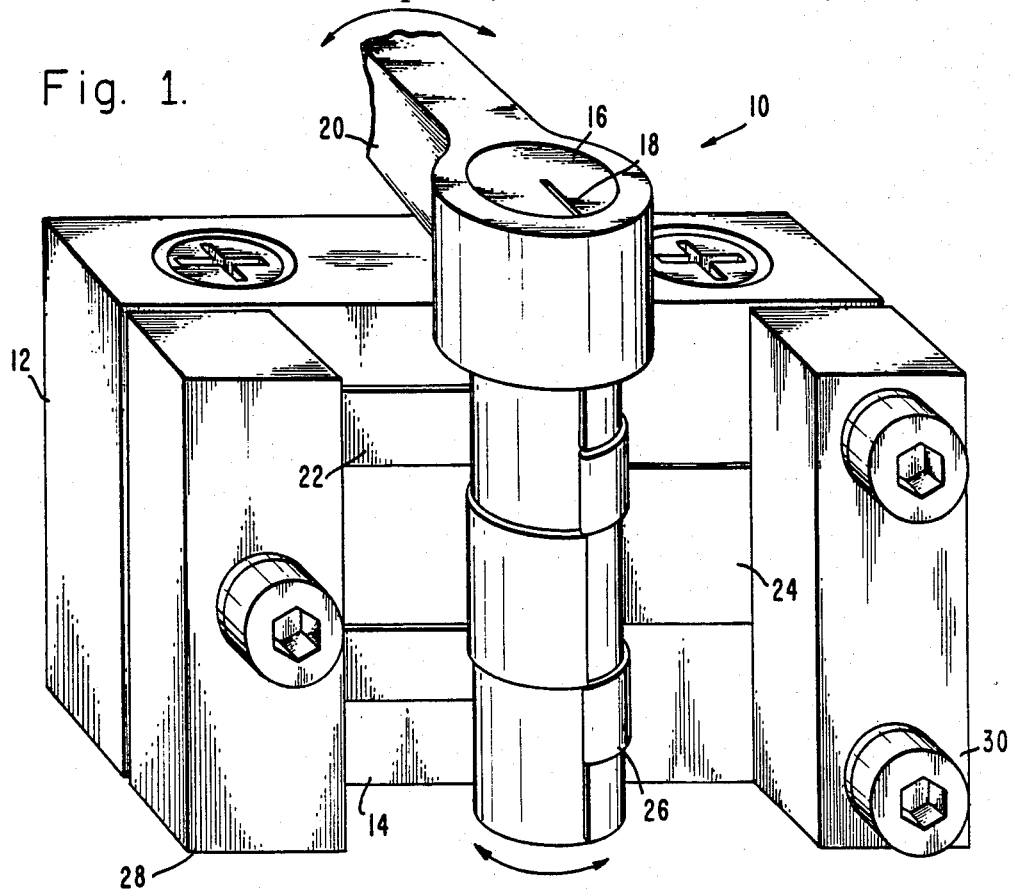
FIG. 1 as a perspective view of the first preferred of embodiment of the low friction pivot of this invention.
Figure 2:
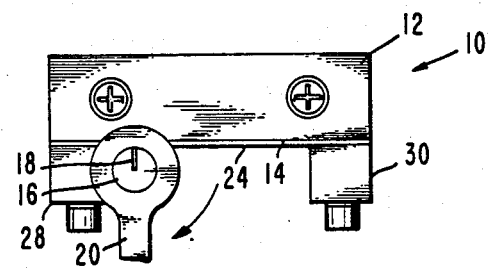
FIG. 2 as a plan view on a reduced scale of the structure of FIG. 1, showing it in a first limit position.
Figure 3:
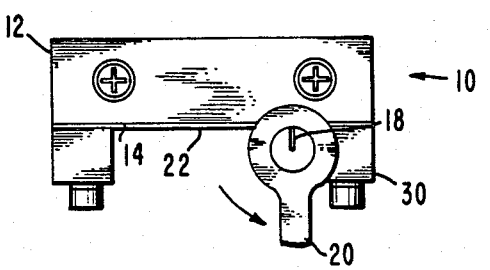
FIG. 3 is similar to FIG. 2, showing the low friction pivot in a second limit position.

The first preferred embodiment of the low friction pivot of this invention is generally indicated at 10 in FIGS. 1, 2, and 3. The low friction pivot structure illustrated in those figures comprises a base 12 which has a flat front surface 14. Base 12 may be secured to another member, or may be in itself the member with respect to which pivot pin support and rotation is desired.

Pivot pin 16 is a cylindrical pin having a central axis, upright in FIG. 1 and perpendicular to the sheet in FIGS. 2 and 3. Pivot pin 16 has a longitudinal slot 18 therein which is illustrated as being radial and parallel to the axis, and may extend to the axis as illustrated. Arm 20 is secured to pivot pin 16 and represents the structure which is required to be rotatively mounted with respect to base 12. Arm 20 may carry any structure thereon which is a rotatable part of the instrument or machine of which pivot 10 is a portion.

Pivot pin 16 is supported with respect to base 12 by means of three bands 22, 24, and 26. These bands are portions of the band system. Bands 22, 24, and 26 are thin resilient bands and for a long lasting structure are of such material and such thickness that when wound around the exterior of pin 16, their fatigue limit is not exceeded. This data is well known for various materials and the engineering calculations by which the thickness of the bands is calculated are well known. The outer ends of bands 22 and 26 are clamped to surface 14 by means of clamp block 28 and the outer end of band 24 is clamped to surface 14 by means of clamp block 30. The inner ends of the bands are wound a half a turn around pivot pin 16 when it is in its central position shown in FIG. 1, and are inserted into longitudinal slot 18. The bands preferably each have a preformed 90° hook thereon for this attachment. In the central position, when longitudinal slot 18 points directly away from and is perpendicular to surface 14, pivot pin 16 can rotate substantially 180° in either direction. These limits are illustrated in FIGS. 2 and 3. Clamp blocks 28 and 30 also act as limit stops for rotation.

In view of the fact that pivot pin 16 is spaced from surface 14 by means of the bands, it is preferable that the bands each have the same thickness. However, physical stability could still be achieved if bands 22 and 26 were the same thickness and band 24 somewhat thinner. It is an essential and critical part of this invention that the torque applied by the bands onto the pivot pin 16 be equal and opposite. For each of achieving this result, the bands are preferably all of the same thickness and are of the same material, and the bands 22 and 26 are each half the width of band 24. That is the preferred embodiment, but it can be appreciated that torque balancing can be achieved even with different band materials, different band thicknessess and different band widths, providing these factors are all balanced to provide the net zero torque on pivot pin 16. The band material must have a Young's modulus of elasticity to provide mechanical security to the pivot pin and under those circumstances it is even more important that the bending forces be balanced. Furthermore, while three bands are illustrated it is appreciated that more bands could be applied. This is particularly the case where a long pivot pin 16 is part of the mechanism, and it may have a pair of bands at each end thereof to provide maximum stability.

In the low friction pivot structure 10, pivot pin 16 has its axis translate linearly during the rotation of the pivot pin about its axis. The translation of pivot pin 16 can either be incorporated into the mechanism and used to advantage in the design of the mechanism, or can be compensated by other structure.

This invention has been described in its presently contemplated best modes and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A pivot structure comprising:
   a flat base member;
   a cylindrical pivot pin member;
   band means including metallic bands each having a first portion and a second portion, with said first portion affixed by way of first affixing means to said cylindrical member and said second portion affixed by way of second affixing means to said flat base member, one of said bands extending around said cylindrical member in a first circumferential direction and another of said bands extending around said cylindrical member in a second circumferential direction opposite from said first direction, the thickness of said metallic bands being such that said bands are not stretched beyond their fatigue limit, said bands configured so that the bending forces of said pivot pin are substantially balanced;
   said bands interposed between pivot pin member and said flat base member;
   said interposed bands abutting said flat base member on one side of said bands;
   said interposed bands abutting said pivot pin member on the opposite side of said bands;
   said flat base member and said interposed bands limiting movement of said pivot pin member in a direction towards said flat base member;
   said flat base member positioned as a load bearing support surface for said pivot pin means and said interposed band means; and
   said flat base member serving to support loads on said pivot pin member which are directed normal to and towards said flat base member and transmitted through said interposed band means;
   wherein there are three bands, with two of said bands extending around said pivot pin member in one circumferential direction and a third band extending around said pivot pin in the opposite circumferential direction;
   and wherein said bands are of substantially equal thickness and the width of said third band is substantially equal to the sum of the widths of the two other bands.

2. The pivot structure of claim 1 wherein said bands wrap substantially half way around said cylindrical pivot pin member when said pivot pin is in one rotative position.

3. A pivot structure comprising:
   a flat base member;
   a cylindrical pivot pin member having an exterior surface;
   metallic band means having a first portion and a second portion, said first portion of said band means being affixed by way of first affixing means to said flat base member and said second portion of said band means being affixed by way of second affixing means to said pivot pin member, said band means extending around the exterior surface of said pivot pin;
   said affixation of said band means to said pivot pin being a clamp which comprises a slot within said cylindrical pivot pin member with an end of said band positioned within said slot, said band means being affixed to said base by a clamp block engaging said band means against said flat base member so that said band means is clamped in place at each of its ends for securing said pivot pin to said base and for permitting limited rotary motion of said pivot pin with respect to said base, said cylindrical pivot pin being of such curvature and the thickness of said band means being such that said band means does not stretch beyond a fatigue limit;
   said band means interposed between said pivot pin member and said flat base member;
   said interposed band means abutting said flat base member on one side of said band means;
   said inerposed band means abutting said pivot pin member on the opposite side of said band means;
   said flat base member and said interposed band means limiting movement of said pivot pin member in a direction towards said flat base member;
   said flat base member positioned as a load bearing support surface for said pivot pin means and said interposed band means; and
   said flat base member serving to support loads on said pivot pin member which are directed normal to and towards said flat base member and transmitted through said interposed band means.

* * * * *